April 12, 1938.  C. H. MILLER  2,113,923
FILTER
Filed Dec. 7, 1936
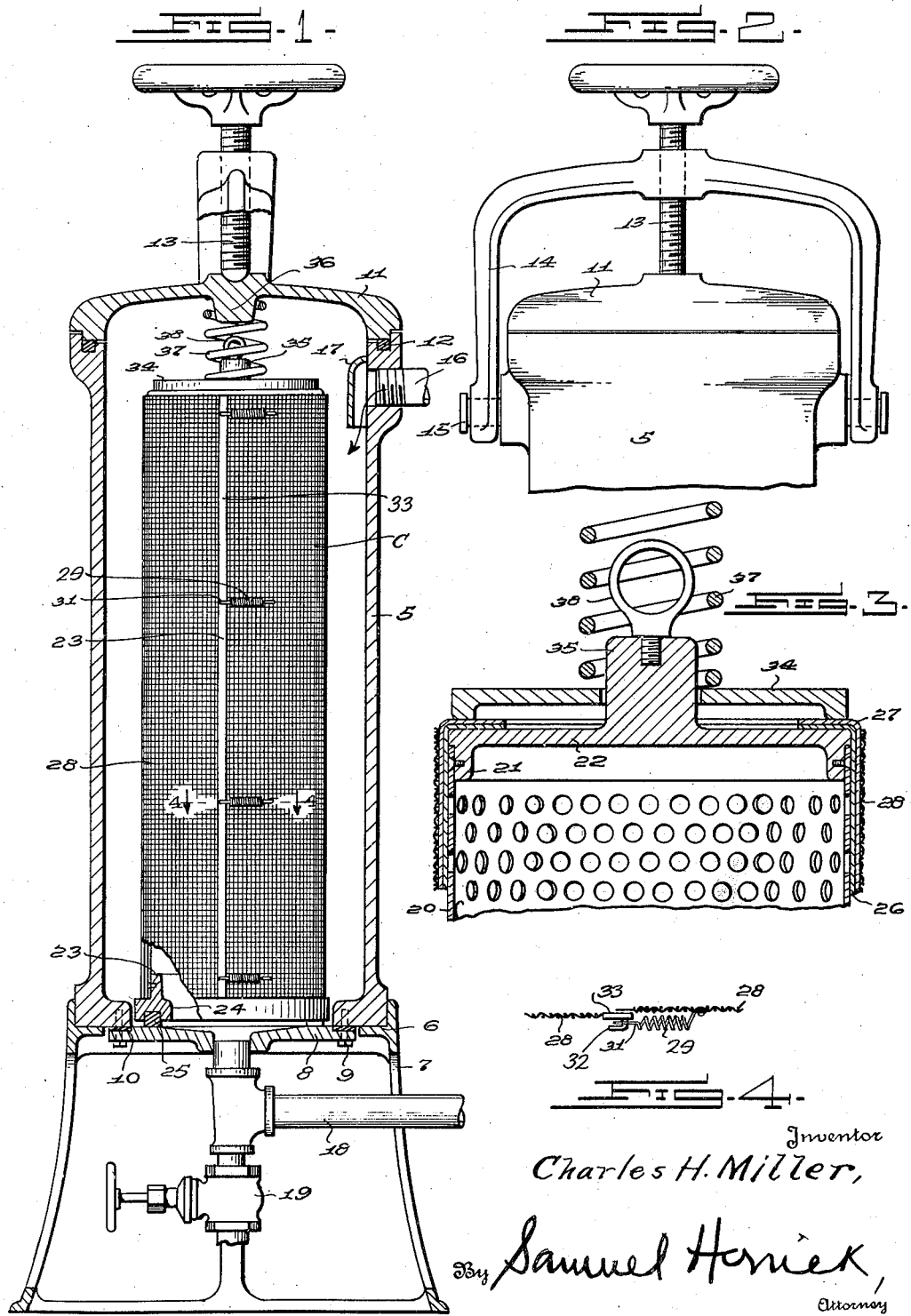
Inventor
Charles H. Miller,
By Samuel Harrick,
Attorney Patented Apr. 12, 1938

2,113,923

UNITED STATES PATENT OFFICE 2,113,923

FILTER

Charles H. Miller, Chicago, Ill.

Application December 7, 1936, Serial No. 114,685

4 Claims. (Cl. 210—183)

This invention relates to filters adapted to filter liquids of many different kinds, but primarily intended for the purpose of filtering water.

The primary object of the invention is to provide a continuous flow filter, adapted to be included in a water line, the filtering element of which is so constructed and mounted as to constitute a cartridge type of element, adapted to be readily removed and another substituted therefor, or alternatively, so constructed that the filtering media upon this cartridge may be easily and quickly replaced.

It is a further object of the invention to provide a filter of the character indicated, in which the parts are so constructed as to permit of easy and economical construction and assembly, and wherein the resultant article, as a whole, will present an attractive appearance. Further objects and advantages of the invention will be set forth in the detailed description which follows.

In the accompanying drawing:

Figure 1 is a vertical sectional view of a filter constructed in accordance with the invention;

Fig. 2 is a fragmentary side elevation;

Fig. 3 is a fragmentary sectional view through the upper portion of the filter cartridge, upon a scale larger than that of Fig. 1, and Fig. 4 is a detail section through one of the screen securing latches hereinafter described.

Like numerals designate corresponding parts in all of the figures of the drawing.

The filter of the present invention comprises a main shell 5, adapted to have a seating at 6 upon a supporting base 7. The bottom of the shell 5 is closed by a base plate 8. Bolts 9 secure the plate 8 to shell 5, and the joint between these two parts is made a fluid-tight one by means of a suitable gasket 10. The top of the shell 5 is closed by a cap 11, adapted to be forced into fluid-tight engagement with a gasket 12 by means of screw 13. The screw 13 is carried by a swinging yoke 14, the latter being pivoted upon trunnions 15 of shell 5.

The water to be filtered enters the shell 5 through an inlet pipe 16 and is directed downwardly without splashing by means of a baffle shield 17. This water passes from the outer portion of shell 5 to the interior of the filter cartridge, designated as a whole at C, and passes from the bottom of this cartridge to a discharge or service pipe 18. A drain valve is indicated at 19.

A most important feature of the invention resides in the construction of the cartridge C and the method of mounting the same easily and quickly in fluid-tight engagement with the base plate 8 of the shell 5. This cartridge comprises an inner foraminous member or screen 20, preferably of metal. This screen is secured to the depending flange 21, of a top plate 22, and is secured at its bottom to the upstanding flange 23 of a base ring 24.

This base ring is channeled upon its under face for the reception of a gasket 25, which may be of rubber or any other suitable compressible material, which, when pressed forcibly against the upper face of the plate 8, serves to form a fluid-tight contact therewith. Thus, water from the outer portion of the shell 5 cannot pass directly to the service pipe 18 but can reach said service pipe only by passing through the filtering elements of the cartridge C.

These filtering elements may be varied at will, but, in the particular embodiment of the invention which I have chosen for purposes of illustration, they comprise, first, a covering of filter cloth 26, which is applied directly over the screen 20. This is followed by a layer of filter paper 27, applied over the filter cloth. Then a protecting wire screen 28 is placed around the whole and is clipped in position by the springs 29.

These springs are connected at 30 to the material of the screen 28, and, at their opposite ends, are provided with loops 31, adapted to engage over hooks 32, carried by a binding strip 33 of one edge of screen 28. The upper ends of the filter paper and filter cloth are turned over upon the top plate 22 and are clipped in position by a pressure plate 34.

The plate 22 carries an upstanding boss 35, and this boss, in connection with a downwardly projecting boss 36 of cap 11, positions a stout spring 37 in such fashion that when the cap 11 is forced downwardly by screw 13, the spring 37 will force plate 34 into engagement with the filtering elements 26 and 27 and will also force the cartridge as a whole toward the base plate 8, to bring about the fluid-tight engagement hereinbefore referred to.

A finger ring 38, carried by the boss 35, provides means by which the cartridge may be easily and quickly lifted out of the filter and another substituted therefor, when desired. It is clear that in order to do this, it is only necessary to loosen screw 13, swing yoke 14 to one side, and lift off cap 11 and spring 37.

I wish to emphasize the importance and value of the protective and flexible outer screen 28, disposed about the filter cloth and filter paper. In some filters heretofore proposed, no such protective element has been provided and reliance has been had upon the substituting of new filtering material before excessive deterioration of the filter paper, etc., has taken place.

However, it is a well known fact that filters are frequently neglected over long periods of time, and undue neglect may result in such complete disintegration of unprotected filtering material as to cause troublesome clogging of the filters.

It is to be understood that the invention is not limited to the precise construction set forth, but that it includes within its purview such changes as may fairly come within either the terms or the spirit of the appended claims.

Having described my invention, what I claim is:

1. A filter of the character described comprising a main shell, a closure adapted to fit upon the main shell, means for forcing said closure to its seat upon said shell, a filter cartridge comprising a top plate, a bottom ring, a cylinder of perforated metal connecting said plate and ring, a sheet of filtering material about said cylinder, the upper ends of which are over-turned upon the top plate, a pressure plate disposed above said top plate and pressing upon the over-turned edge of the filtering material, and means exerting a straight thrust between the cap and pressure plate for applying pressure to the pressure plate.

2. A filter of the character described comprising a main shell, a closure adapted to fit upon the main shell, means for forcing said closure to its seat upon said shell, a filter cartridge comprising a top plate, a bottom ring, a cylinder of perforated metal connecting said plate and ring, a sheet of filtering material about said cylinder, the upper ends of which are over-turned upon the top plate, a pressure plate disposed above said top plate and pressing upon the over-turned edge of the filtering material, interengaging guide means between the top plate and the pressure plate, and a spring bearing between the pressure plate and the cover.

3. A filter of the character described comprising a main shell, a closure adapted to fit upon the main shell, means for forcing said closure to its seat upon said shell, a filter cartridge comprising a top plate, a bottom ring, a cylinder of perforated metal connecting said plate and ring, a sheet of filtering material about said cylinder, the upper end of which is over-turned upon the top plate, a pressure plate disposed above said top plate and pressing upon the over-turned edge of the filtering material, an upstanding boss carried by the top plate which projects through an opening of the pressure plate, a spring surrounding said boss and bearing upon the pressure plate, and means carried by the cover for engaging the upper end of said spring.

4. A device of the character described comprising a main shell, a removable cover for said shell, pressure exerting means for forcing the cover to its seat upon said shell, a bottom for said shell having an outlet opening, a filter cartridge comprising an imperforate top plate, a bottom ring, a gasket carried by the lower face of the bottom ring and bearing upon the filter bottom, a foraminous cylinder connecting the bottom ring and the top plate, a plurality of sheets of filtering material extending around said cylinder, and having overturned upper end portions, a pressure plate bearing upon the upper ends of said sheets of filtering material, an upstanding projection carried by the top plate which passes through the pressure plate, a depending projection carried by the cover, and a spring engaging said projections for exerting pressure between the cover and said top plate, to thereby force the gasket of the ring into fluid-tight engagement with the bottom of the main shell and to hold the pressure plate into engagement with the sheets of filtering material.

CHARLES H. MILLER.